United States Patent
Breen et al.

[11] Patent Number: 5,867,669
[45] Date of Patent: Feb. 2, 1999

[54] APPARATUS AND METHOD FOR UPGRADING COMMUNICATION FUNCTIONS

[75] Inventors: Thomas B. Breen, Lansdowne, Pa.; Donald R. Brown, Farmington, Conn.

[73] Assignee: General Electric Company, Schenectady, N.Y.

[21] Appl. No.: 497,970

[22] Filed: Jul. 3, 1995

[51] Int. Cl.$^6$ .............................. G06F 13/38; G06F 15/17
[52] U.S. Cl. ................................. 395/200.8; 395/200.58; 395/282; 370/463
[58] Field of Search ................... 395/200.12, 200.14, 395/200.17, 200.2, 200.02, 831, 834, 200.58, 200.67, 200.66, 200.8, 200.79, 282, 283; 370/463, 466, 467, 469; 361/686

[56] References Cited

U.S. PATENT DOCUMENTS

| | | | |
|---|---|---|---|
| 4,656,605 | 4/1987 | Clayton | 365/52 |
| 4,858,112 | 8/1989 | Puerzer et al. | 395/200.8 |
| 4,979,169 | 12/1990 | Almond et al. . | |
| 5,245,704 | 9/1993 | Webber et al. | 395/200.16 |
| 5,278,972 | 1/1994 | Bakewr et al. | 370/467 |
| 5,303,344 | 4/1994 | Yokohama et al. | 395/200.6 |
| 5,305,317 | 4/1994 | Szczepanek | 370/469 |
| 5,391,094 | 2/1995 | Kakinoki et al. | 361/686 |
| 5,420,412 | 5/1995 | Kowalski | 395/831 |
| 5,457,601 | 10/1995 | Georgopulos et al. | 361/686 |
| 5,524,252 | 6/1996 | Desai et al. | 395/200.02 |
| 5,535,342 | 7/1996 | Taylor . | |
| 5,541,930 | 7/1996 | Klingman | 370/463 |
| 5,579,487 | 11/1996 | Meyerson et al. | 395/282 |
| 5,581,558 | 12/1996 | Horney, II et al. | 370/466 |
| 5,659,684 | 8/1997 | Giovannoni et al. | 395/200.8 |

OTHER PUBLICATIONS

Texas Instruments; "ThunderLAN offers freedom of choice"; Manufacturer's Product Announcement; vol. 12, No. 4; retrieved from internet at http://www.ti.com/sc/docs/integrat/95may/lan.htm, May 1995.

Texas Instruments; "Texas Instruments Provides High Performance Networking Protocol Flexibility With Single Chip Architecture"; Manufacturer's Product Announcement SPW02 SC-95024; retrieved from internet at http://www.ti-.com.sc/docs/news/1995/95024.htm, Mar. 20, 1995.

Merenbloom, P.; "The WAN psychology: a study of protocols and their behavior"; Infoworld Magazin; vol. 16, Iss. 17, p. 78, Apr. 25, 1994.

*Primary Examiner*—Mark H. Rinehart
*Attorney, Agent, or Firm*—Carl B. Horton; Duane, Morris & Heckscher, LLP

[57] ABSTRACT

Electrical equipment is provided with an upgradable communication converter module in the form of a printed circuit board. The module is plugged into a communication converter module receptacle on the equipment for providing communication exchange between the equipment internal communication system and an external communication network. The communication converter module printed circuit board contains a network protocol interface, an isolated interface, a protocol converter, and an internal protocol interface.

7 Claims, 3 Drawing Sheets

APPARATUS AND METHOD FOR UPGRADING COMMUNICATION FUNCTIONS

BACKGROUND OF THE INVENTION

The present invention relates to electrical equipment operating within a communication network, and in particular, to such equipment having upgradable communication functions and methods related thereto.

In the power industry, various equipment such as relays, power meters, and circuit breakers are often implemented within a communication network. In such a network, communication is possible across a communication channel of the network either between the equipment or between a particular piece of equipment and a master processor or control center. For instance, a given piece of equipment may transmit or receive commands over the network. The communication network typically employs a standardized communication protocol to regulate and define acceptable standards for communication across the network. The GE's commnet® protocol is often utilized in such communication networks. A similar communication protocol used within various industrial and commercial environments is generically known as "Ethernet."

As an example of commands transmitted over a communication channel of a communication network, an electrical relay may receive a command from a controller on the network that instructs the relay to reset or send data. Alternatively, the relay may transmit a command over the network to a controller that an event has occurred. Similarly, a power meter on the network may receive a command from a controller on the network that instructs the power meter to acquire data. In turn, the power meter may transmit a command over the network to a controller that a quantity has exceeded a predetermined limit. As another example, a circuit breaker on the network may receive a command from a controller on the network that instructs the circuit breaker to operate. The circuit breaker may also transmit a command over the network to the controller to indicate that it has opened.

U.S. Pat. No. 5,245,704 entitled "System for Sharing Data Between Microprocessor Based Devices" describes one arrangement for communicating between a programmable logic device and a host computer. Equipment on such a communication network often utilize a different internal communication protocol than that utilized on the network. Such equipment may also process information at a different speed than information is transmitted across the network. For example, a relay may employ an internal serial communication protocol such as the RS232 protocol, while the relay may be desired to be connected to a communication network employing the COMMNET™ protocol. In order for the relay to communicate with other equipment on the network, i.e. to transmit and receive information over the network, the relay employs a circuit to translate information from its internal communication protocol to that of the network, and vice-versa.

For example, a communication converter is employed, which has the ability to receive commands in the network'COMMNET® communication protocol, and to convert these commands to internal serial RS232 commands for processing by the relay. Similarly, when the relay issues a RS232-compatible serial command to be transmitted to other equipment or a controller across the network, the communication converter converts the internal serial command into a COMMNET™-compatible command for broadcast across the network. One example of a PC card having multiple communication protocols for telephone applications is found in U.S. Pat. No 5,420,412 entitled "PC-Card Having Several Communication Protocols."

Different network communication protocols continually evolve and are implemented on such communication networks. For example, the COMMNET™ protocol used on a given network may be upgraded to a different or more advanced protocol. A wide variety of network protocols are possible, and thus new communication converters may be designed to convert or translate between other network protocols and the internal protocol of the equipment. Further, new network protocols may be developed subsequent to the design and manufacture of a given communication converter, in which case the user must adapt the equipment to the new protocol.

When equipment is to be utilized within a network having a network communication protocol that is incompatible with the internal communication protocol of the equipment, the communication converter must be changed. However, because such communication converter circuits are typically integrated into the equipment, such upgrading is inconvenient and expensive. To install a new communication converter within the equipment may require physically inactivating the equipment, removing the communication converter circuit components and soldering connections for the new components. Alternatively, the entire equipment may have to be replaced with new equipment containing an upgraded communication converter, even though remaining parts of the equipment do not otherwise need to be replaced.

It is accordingly an object of the invention to provide improved equipment having modular communication converter assemblies for upgrading the equipment to meet various existing and future network communication protocols without soldering or replacement of the equipment.

SUMMARY OF THE INVENTION

There is provided herein equipment having a communication converter module along with methods for upgrading. The communication converter module includes a processor for performing the protocol conversion functions, a network protocol interface, an isolated interface, and an internal protocol interface. The communication converter module is removably mounted to the equipment by means of an externally accessible module receptacle.

DEDESCRIPTION OF THE PREFERRED EMBODIMENT

Figure 1:
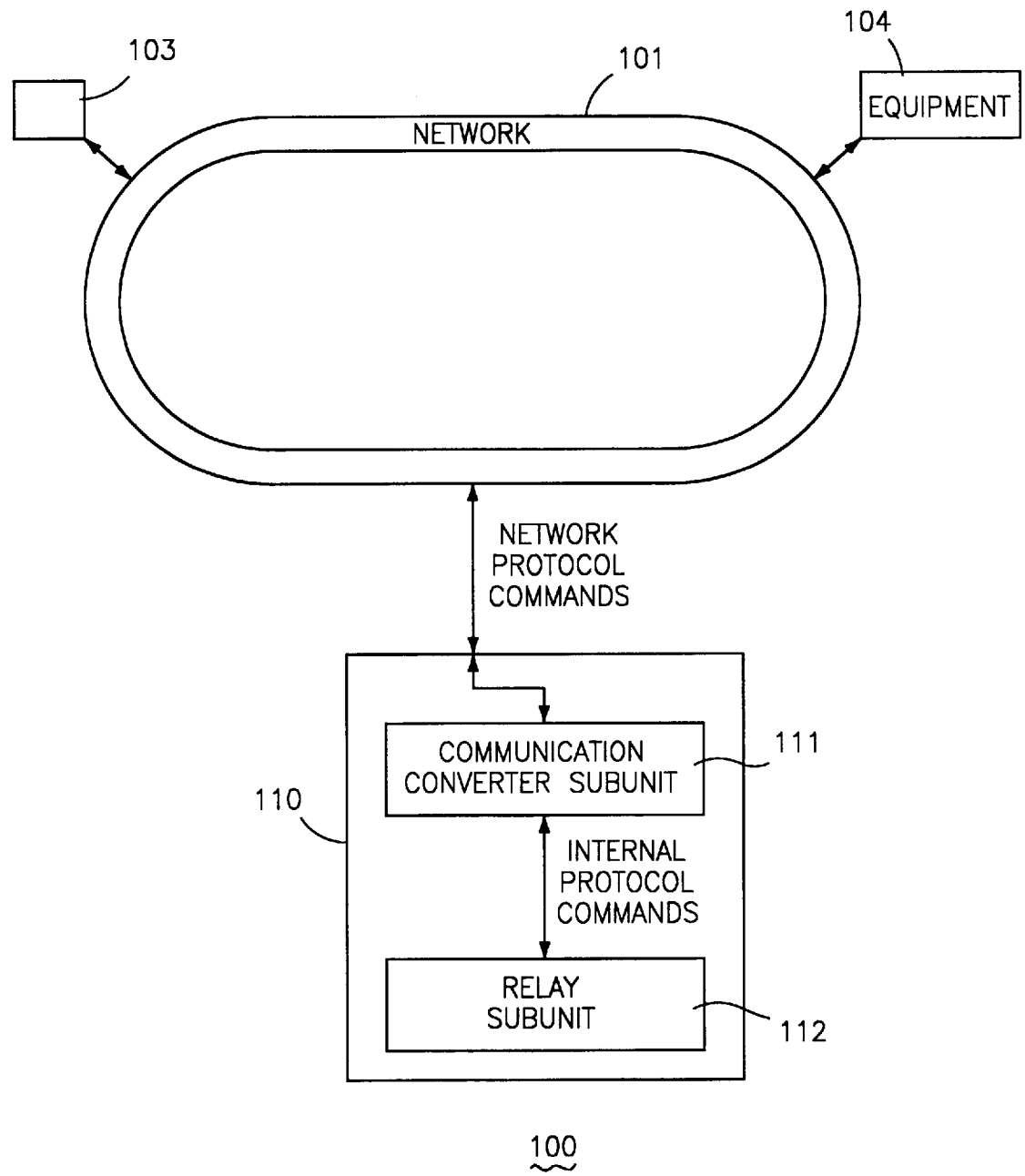
FIG. 1 is a communication network connecting with electrical equipment in accordance with the prior art.

Referring now to FIG. 1, there is shown a communication network system 100 with network 101 and illustrative equipment 103, 104, and 110 in accordance with the present invention. As described hereinabove, equipment 103, 104, and 110 can represent relays, power meters, or circuit breakers such as described in U.S. Patent Application Ser. No. 08/075,429 filed Jun. 14, 1993, entitled "Modular Industrial Control Relay"Equipment 110 contains various functional units, such as a communication converter subunit 111 and a relay subunit 112. As shown, communication converter 111 converts commands between the internal protocol and the network protocol to allow relay subunit 112 to receive and send information to network 101. As described earlier, when the network protocol of network 101 changes, the communication converter 111 within the equipment 110 becomes obsolete. In this case, when all components of the equipment 110 are hardwired, the equipment may have to be removed and a new communication converter installed to allow the relay subunit 112 and network 101 to communicate.

Figure 2:
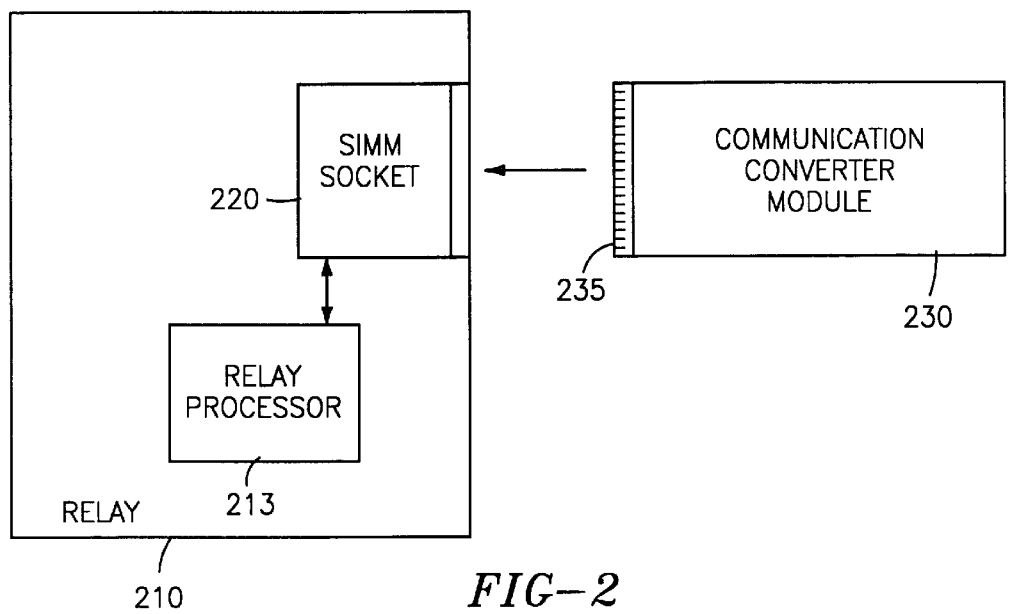
FIG. 2 depicts an upgradable relay device and communication converter module for connection within the communication network of FIG. 1.

Referring now to FIG. 2, there is shown a relay 210 adapted to receive a communication converter module 230 for allowing communication with the network system 101 of FIG. 1. As illustrated in FIG. 2, relay device 210 contains a relay processor 213 and a single in-line memory module (SIMM) socket 220 such as distributed by AMP, Inc., typically used for receiving a memory board to provide increased memory to a processor. One example of a SIMM socket providing extra memory to a computer system is found in U.S. Pat. No 4,656,605 entitled "Single In-Line Memory Module." The SIMM socket in this invention is used to connect internally with the relay processor 213 and to connect externally with the communication converter module 230. The arrangement of the contacts 235 at the edge of the communication converter module provides electrical and mechanical connections with the processor 213 by connecting with the SIMM socket 220.

Figure 3:
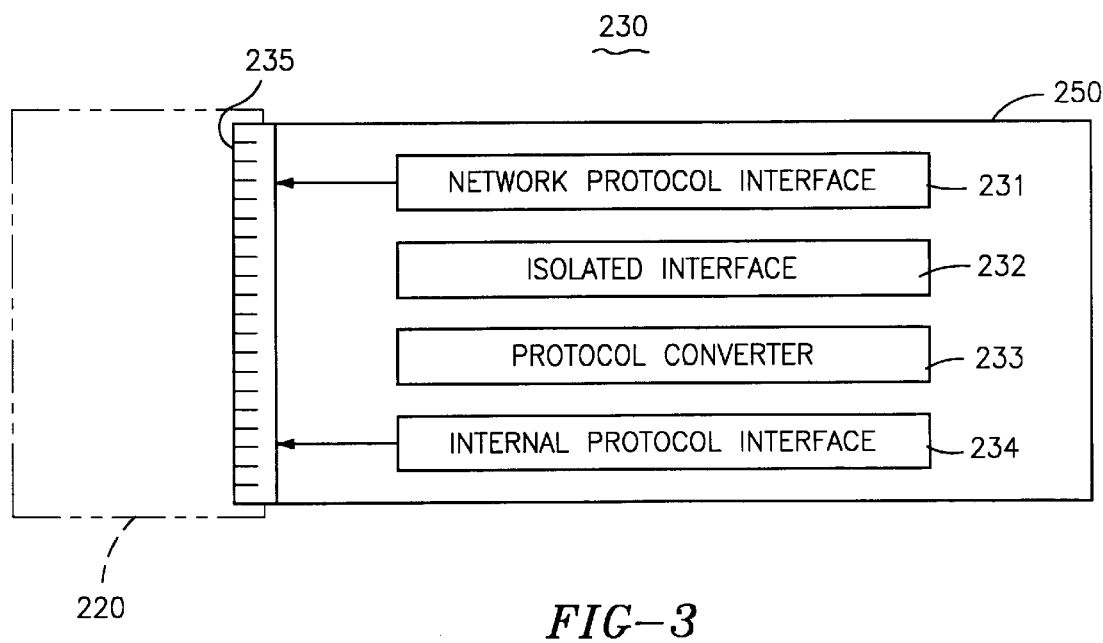
FIG. 3 is a detailed block diagram of the communication converter module of FIG. 2.

As shown in FIG. 3, the communication-related components of the relay 210, such as the network protocol interface 231, isolated interface 232, protocol converter 233, internal protocol interface 234, and contacts 235 are carried on a single printed circuit board 250 that comprises the communication converter module 230. The contacts 235 are designed for securely and removably mounting the communication converter module 230 into the SIMM socket 220 of the relay 210. When the communication converter module 230 is mounted to the SIMM socket 220, as indicated in phantom, contacts 235 serve to electrically connect the components of communication converter module 230 with the remaining components of relay 210, to allow the relay 210 to communicate with the network 101. Accordingly, the communication converter module terminal 235 serves as a mechanical mounting means by which the communication converter module may be removably mounted to the SIMM socket 220.

When the communication converter module 230 needs to be upgraded, the communication converter module 230 is unplugged from the relay 210, and an upgraded communication converter module is plugged in the SIMM socket 220, thereby easily upgrading the communication functions of the relay 210 without having to replace the entire relay.

Figure 4:
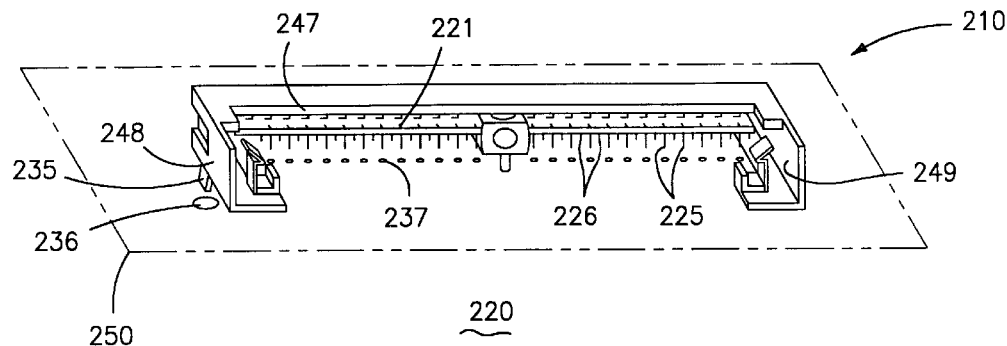
FIG. 4 is a front perspective view of a single in-line memory module socket of the relay device of FIG. 2, in accordance with the present invention.

The SIMM socket 220 is shown in FIG. 4 to detail the downwardly extending posts 235 that are received within apertures 236 formed in the printed circuit board 250 depicted in phantom on the relay 210 to mechanically position and attach the SIMM socket to the relay, while the pin connectors 226 extending from the bottom become engaged within the corresponding receptacles 237 within the printed circuit board 250 to electrically connect the contacts 235 (FIG. 3) with the receptacles 221 arranged on the front surface of the SIMM socket. The SIMM socket is in the form of a U-shaped single plastic configuration that defines a pair of opposing sidewalls 248, 249. An internally-projecting v-shaped slot 247 houses the receptacles 221 while providing means for encompassing the end part of the communication converter module 230 shown earlier in FIG. 3.

Figure 5:
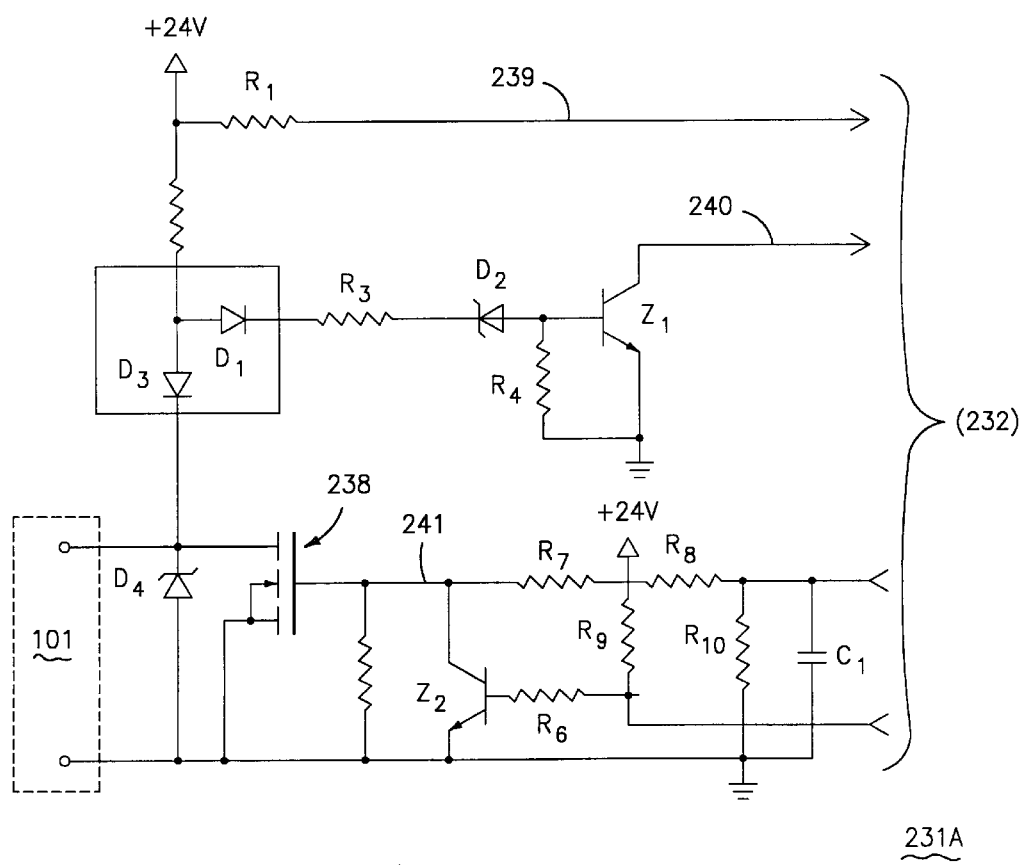
FIG. 5 is a schematic representation of the components used within a typical commnet network protocol interface of FIG. 3.

The network interface circuit 231A is shown in FIG. 5 and is configured to interface with the COMMNET™ network protocol described earlier. The circuit is printed on printed circuit board 250, shown in FIG. 3. The circuit includes a positive rail 239 that connect between a reference voltage source and the optically isolated interface 232 through a current-limiting resistor R1. Rail 240 provides a conditioned receive signal to the optically isolated interface 232. The signal from the network 101 raises the cathode voltage of diode D3 to the point that diode D1 becomes forward biased allowing the signal to pass through a current-limiting resistor R3, the anode of a Zener diode D2, the gate of the transistor Z1, and to ground through the bias resistor R4. The anode of the transistor Z1 provides the receive communication signal to the isolation circuit 232 over the conductor 240 and the cathode of the transistor switch connects with ground. A command is transmitted to network 101 from the protocol converter 233 through the isolated interface 232 and external protocol interface 231. The signal propagates from the isolated interface 232 through the resistors R6, R7, R8, R9, and R10 to cause transistor Z2 to switch open. When Z2 has opened, the gate 241 of FET 238 reaches a voltage sufficient to switch the FET 238 on and generate a signal on network 101. Diode D4 and capacitor C1 are used to absorb undesirable transients.

A communication converter module has herein been described that is adapted to be received within a connector that receives the module in removable fashion to allow ease in replacement in order to provide communication converter modules with the ability to interface to different network communication protocols. When a new network protocol is required, the communication converter module is removed, and is replaced with a new communication converter module that directly communicates with the corresponding new protocol used with the new network 101.

What is claimed is:

1. A communications converter module comprising:

an edge connection having contacts at one end for securely and removably mounting and coupling the communications converter module into a socket of an electrical equipment apparatus adapted to receive the communications converter module the electrical equipment apparatus having an internal communications system electrically-coupled to said socket, said socket being electrically-coupled to a network communications system;

a network protocol interface circuit on said module electrically-connecting with said contacts and arranged for electrical connection with the network communication system via the socket when the communication converter module is mounted in the socket;

a protocol converter circuit;

an isolated interface circuit on said module electrically-connecting between said network protocol interface circuit and said protocol converter circuit; and an internal protocol interface circuit connecting with said protocol converter circuit and with the internal communication system via the socket when the communication converter module is mounted in the socket, whereby said network communication system and said internal communication system exchange communication therebetween.

2. The communication converter module of claim 1 wherein said module comprises a printed circuit board.

3. The communication converter module of claim 1 wherein said contacts are adapted to be received within a single in-line memory module connector.

4. The communication converter module of claim 3 wherein said memory module connector is attached to electrical equipment.

5. The communication converter module of claim 4 wherein said memory module connector has a U-shaped configuration defining receptacle means within a front part thereof for receiving said contacts thereby providing electrical and mechanical connection with said communication converter module.

6. The communication converter module of claim 4 wherein said memory module connector includes a plurality of pin connectors extending from a bottom surface, said pin connectors providing electrical connection between said communication converter module and associated electrical equipment.

7. Electrical equipment coupled to an external network communication system having a network protocol, the electrical equipment comprising:

an internal communication system having an internal protocol; and a socket electrically coupled to the external network communication system and to the internal communication system and for receiving a communications converter module comprising:

an edge connection having contacts at one end for securely and removably mounting and coupling the communications converter module into the socket;

a network protocol interface circuit electrically coupled with said contacts and arranged for electrical connection with the network communication system via the socket when the communication converter module is mounted in the socket;

an isolated interface circuit electrically coupled with said network protocol interface circuit;

a protocol converter circuit electrically coupled with said isolated interface circuit; and an internal protocol interface circuit electrically coupled with said protocol converter circuit, and with the internal communication system via the socket when the communication converter module is mounted in the socket, whereby said network communication system and said internal communication system exchange communication therebetween.

\* \* \* \* \*